United States Patent [19]

Wheeler

[11] 4,336,946
[45] Jun. 29, 1982

[54] NON-ROTATABLE ELASTOMERIC O-RING SEAL

[75] Inventor: John H. Wheeler, Dallas, Tex.

[73] Assignee: The Texacone Company, Dallas, Tex.

[21] Appl. No.: 185,205

[22] Filed: Sep. 8, 1980

[51] Int. Cl.³ .................... F16J 15/24; F16J 15/32
[52] U.S. Cl. .................................... 277/211; 277/152;
                                                277/165; 277/189
[58] Field of Search ............... 277/165, 167.5, 207 R,
        277/189, 207 A, 186, 208–211, 188 R, 188 A,
                                            152, 153; 285/231

[56] References Cited

U.S. PATENT DOCUMENTS

| | | |
|---|---|---|
| 2,571,281 | 10/1951 | Neher . |
| 2,635,907 | 4/1953 | Heimbuch . |
| 2,891,827 | 6/1959 | Butkus . |
| 3,147,984 | 9/1964 | Benoit ............................ 277/211 X |
| 3,189,360 | 6/1965 | Haberkorn ..................... 277/209 X |
| 3,279,805 | 10/1966 | Quinson ..................... 277/188 R X |
| 3,288,475 | 11/1966 | Benoit . |
| 3,419,280 | 12/1968 | Wheeler . |
| 3,627,335 | 12/1971 | Wheeler . |
| 3,885,802 | 5/1975 | Wheeler . |
| 3,913,460 | 10/1975 | Wright . |
| 4,020,910 | 5/1977 | Peterson et al. ............... 277/165 X |
| 4,052,112 | 10/1977 | Faber .......................... 277/188 A X |

FOREIGN PATENT DOCUMENTS

| | | | |
|---|---|---|---|
| 1323614 | 3/1963 | France ............................... 277/209 |
| 89125 | 4/1937 | Sweden .......................... 277/188 A |
| 668356 | 3/1952 | United Kingdom ................ 277/165 |

Primary Examiner—Robert S. Ward, Jr.
Attorney, Agent, or Firm—Richards, Harris & Medlock

[57] ABSTRACT

An elastomeric O-ring seal (10) for sealing between a housing (20) and a shaft (22). The seal (10) defines an inner sealing surface (12) and an outer sealing surface (14) having a generally uniform non-deformed radius of curvature in cross section. An upper protrusion (16) and a lower protrusion (18) extend outward of a circle defined by this radius in cross section to prevent the seal (10) from rolling when placed in sealing engagement with the housing (20) and shaft (22). This reduces the wear on the seal (10) and permits a longer surface life.

1 Claim, 4 Drawing Figures

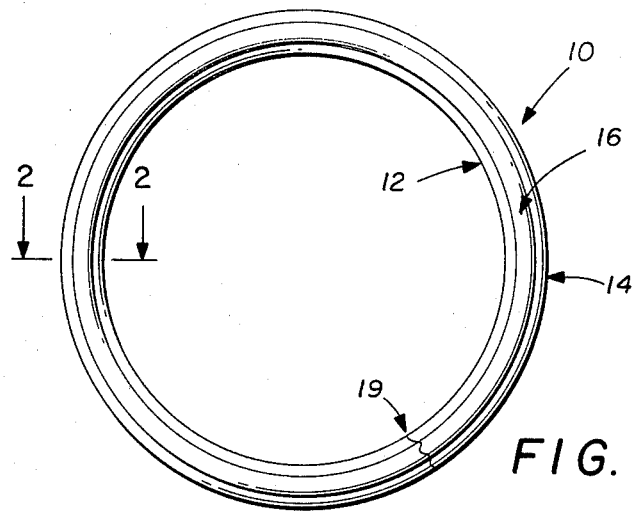
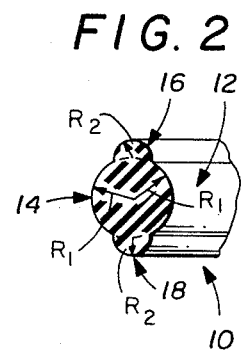
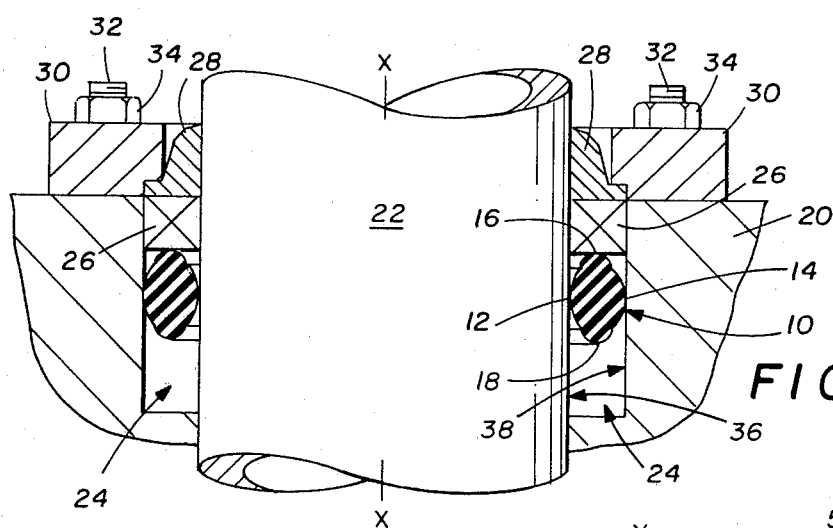
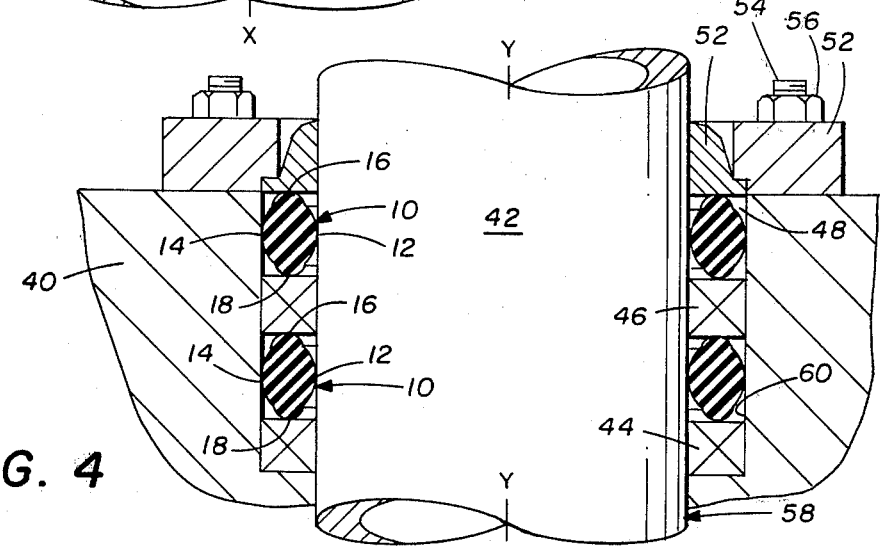

NON-ROTATABLE ELASTOMERIC O-RING SEAL

TECHNICAL FIELD

This invention relates to the art of sealing, and more particularly to an elastomeric O-ring seal for sealing a shaft or piston.

BACKGROUND ART

The use of elastomeric O-ring seals having a generally circular cross section to seal a rotating or reciprocating shaft or piston is well-known. The O-ring seal is typically placed in a sealing groove in sealing engagement with a housing and the shaft or piston to be sealed.

The O-ring seal may, on occasion, roll within the seal groove when the shaft or piston is moved relative to the housing. This will induce excessive wear on the seal itself which may lead to premature failure of the seal.

DISCLOSURE OF THE INVENTION

In accordance with the present invention, a non-rotatable elastomeric O-ring seal is provided.

The present invention provides an elastomeric seal for sealing between first and second members. The elastomeric seal defines first and second sealing surfaces for sealing engagement with the first and second members, respectively. Each of the first and second sealing surfaces is positioned in cross section on a circle having a generally uniform radius of curvature when non-deformed. The seal further defines at least one protrusion extending in cross section radially outward of the circle to prevent rolling of the seal.

The present invention further provides an elastomeric O-ring seal for sealing between a housing and a shaft. The O-ring seal defines first and second opposed seal surfaces having a uniform radius of curvature in cross section when non-deformed and first and second opposed protrusions extending in cross section radially outward of a circle defined by said uniform radius of curvature so that when the first and second opposed sealing surfaces are positioned in sealing engagement with the housing and shaft, respectively, the opposed protrusions prevent rolling of the elastomeric O-ring seal to reduce wear.

BRIEF DESCRIPTION OF THE DRAWINGS

A more complete understanding of the invention may be had by reference to the following Detailed Description when taken in conjunction with the accompanying Drawings, wherein:

FIG. 1 is a top view of an elastomeric O-ring seal forming the present invention in an non-deformed state;

FIG. 2 is a cross-sectional view of the non-deformed seal taken along line 2—2 in FIG. 1 in the direction of the arrows;

FIG. 3 is a partial cross-sectional view of a housing and shaft with the seal in sealing engagement therewith; and FIG. 4 is a partial cross-sectional view of a housing and shaft employing two seals in sealing engagement therewith.

DETAILED DESCRIPTION

Referring now to the drawings, wherein like reference characters designate like or corresponding parts throughout several views, an elastomeric O-ring seal 10 forming the present invention is illustrated. Seal 10 may be formed of any suitable material such as a synthetic or natural rubber material or a plastic.

FIGS. 1 and 2 illustrate seal 10 in the non-deformed or uncompressed state. In this state, the inner sealing surface 12 and outer sealing surface 14 have a generally uniform radius $R_1$ in cross section as shown in FIG. 2. Seal 10 may be substituted for a conventional O-ring seal with an exposed surface lying on a circle of radius $R_1$ in cross section. An upper protrusion 16 and a lower protrusion 18 are formed on seal 10 between the inner and outer sealing surfaces 10 and 14. As can be seen in FIG. 2, the upper protrusion 16 and lower protrusion 18 have a semi-circular cross section of radius $R_2$. Both upper protrusion 16 and lower protrusion 18 extend radially outward in cross section from the circle of radius $R_1$ on which the cross section of the opposed inner and outer sealing surfaces 12 and 14 lie. The seal 10 may be split along line 19 to permit ease of placement.

FIG. 3 illustrates a single elastomeric O-ring seal 10 in sealing engagement with a housing 20 and shaft 22. The shaft may either rotate about its longitudinal axis X—X or may reciprocate along axis X—X. A sealing groove 24 is formed in housing 20 to receive the elastomeric O-ring seal 10. After seal 10 has been placed in the sealing groove 24, a bushing 26 is placed within the sealing groove 24 to guide shaft 22. The seal 10 and bushing 26 are retained within seal groove 24 by annular sleeve 28. Annular sleeve 28, in turn, is confined by a retaining ring 30 secured to the housing 20 by a threaded bolt 32 and nut 34.

As can be seen in FIG. 3, the elastomeric O-ring seal 10 is deformed or compressed so that the inner sealing surface 12 is in sealing engagement with the outer surface 36 of shaft 22 and the outer sealing surface 14 is in sealing engagement with the inner surface 38 of sealing groove 24. Both seal 10 and bushing 26 may move longitudinally along axis X—X within the seal groove 24 as the shaft either rotates about or reciprocates along axis X—X. In one application of the present invention where the distance between outer surface 36 and inner surface 38 was ½", an O-ring seal having a value for $R_1$ of 5/16" was found to provide an effective seal.

In the past, when an elastomeric O-ring seal having a cross section of uniform radius was positioned within a sealing groove, the rotation or reciprocation of the shaft frequently induced the seal to roll or rotate so that the inner sealing surface rolls out of engagement with the outer surface of the shaft and may even move into engagement with the inner surface of the sealing groove before returning to engage the outer surface of the shaft. During rolling, the outer sealing surface would rotate out of engagement with the inner surface of the sealing groove and may move into engagement with the outer surface of the shaft before returning to engage the inner surface of the sealing groove. This has caused excessive wear on the elastomeric O-ring seal and premature failure of the seal. However, in the elastomeric O-ring seal 10 of the present invention, this rolling is inhibited by upper protrusion 16 and lower protrusion 18. The rolling of seal 10 is limited by contact between the upper protrusion 16 and lower protrusion 18 and the outer surface 36 of shaft 22 and the inner surface 38 of sealing groove 24. The upper and lower protrusions 16 and 18 are opposed so that they act in unison to inhibit rolling. The seal 10 is not exposed to the excessive wear induced by the rolling of a conventional O-ring seal and therefore may enjoy a longer useful life.

FIG. 4 illustrates the use of two elastomeric O-ring seals 10 to form a seal between a housing 40 and a shaft 42. Both seals 10 and bushings 44 and 46 are positioned within a sealing groove 48 formed in housing 40. An annular sleeve 50 confines the seals 10 and bushings 44 and 46 therein. Annular sleeve 50, in turn, is confined by a retaining ring 52 secured to housing 40 by means of threaded bolts 54 and nuts 56. The shaft 42 may rotate about its longitudinal axis Y—Y or reciprocate therealong. The inner sealing surface 12 of each of the seals 10 is in sealing engagement with the outer surface 58 of shaft 42 and the outer sealing surface 14 of each of the seals 10 is in sealing engagement with the inner surface 60 of sealing groove 48. The upper protrusion 16 and lower protrusion 18 of each of the seals 10 again prevents rolling of the seals 10 when the shaft either rotates or reciprocates along axis Y—Y.

While the concepts of the present invention have been explained with respect to an elastomeric O-ring seal 10, it is clear that the teachings of the present invention may be employed with any elastomeric seal having arcuate sealing surfaces where rolling or rotation of the seal reduces the service life of the seal. In particular, a length or non-circular segment of an elastomeric seal having a generally circular cross section may be provided with protrusions to resist the rolling of the seal. It is also possible that a single protrusion may prove sufficient to prevent rolling or rotating of the seal.

Although only a single embodiment of the invention has been illustrated in the accompanying drawings and described in the foregoing Detailed Description, it will be understood that the invention is not limited to the embodiment disclosed, but is capable of numerous rearrangements, modifications and substitutions of parts and elements without departing from the spirit of the invention.

I claim:

1. A sealing system comprising:

a shaft having an axis and having an axially extending exterior cylindrical sealing surface;

a housing surrounding the shaft having an axially extending cylindrical interior sealing surface spaced apart from the exterior surface of the shaft to define an O-ring receiving cavity therebetween;

means having radially extending surfaces for closing the opposite ends of the O-ring receiving cavity so that the O-ring receiving cavity is rectangular in cross section;

said shaft and said housing adapted for relative movement so that an O-ring in the O-ring receiving cavity tends to roll relative to the sealing surfaces;

an O-ring positioned in the rectangular O-ring receiving cavity and comprising a main body portion circular in cross section normally having a first relatively large predetermined radius and including an inner sealing surface engaging the outer sealing surface of the shaft around its entire periphery and an outer sealing surface engaging the inner sealing surface of the housing around its entire periphery;

said O-ring further including opposed projections normally extending axially from the main body portion thereof, said projections being extended between the sealing surface of the main body portion and being semicircular in cross section;

said projections each normally having second predetermined radius substantially smaller than the first predetermined radius;

said opposed projections being integrally formed with the main body portion of the O-ring and extending around the entire circumference thereof; and said O-ring comprising the only structure within the rectangular O-ring receiving cavity so that the projections prevent the O-ring from rolling relative to the sealing surfaces of the shaft and the housing.

* * * * *